J. C. BUCK.
GRAIN-DRILLS.

No. 184,331. Patented Nov. 14, 1876.

Witnesses
Wm R. Singleton
C. M. Connell

Inventor
James C. Buck
Per Blanchard & Singleton

THE GRAPHIC CO. N.Y.

UNITED STATES PATENT OFFICE.

JAMES C. BUCK, OF DAYTON, OHIO, ASSIGNOR TO BENJAMIN KUHNS, OF SAME PLACE.

IMPROVEMENT IN GRAIN-DRILLS.

Specification forming part of Letters Patent No. 184,331, dated November 14, 1876; application filed September 26, 1876.

*To all whom it may concern:*

Be it known that I, JAMES C. BUCK, of Dayton, in the county of Montgomery and State of Ohio, have invented certain new and useful Improvements in Grain-Drills; and I do hereby declare that the following is a full, clear, and exact description thereof, which will enable others skilled in the art to which it appertains to make and use the same, reference being had to the accompanying drawings, and to the letters of reference marked thereon, which form a part of this specification—

Figure 1:
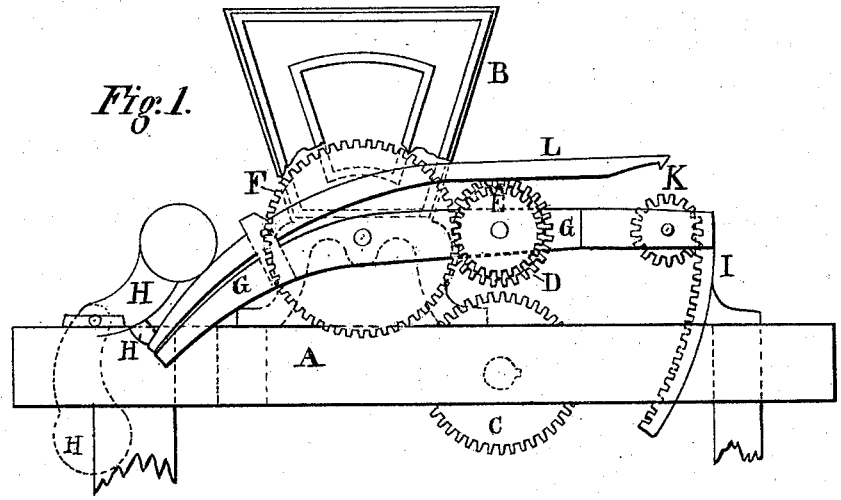
Figure 2:
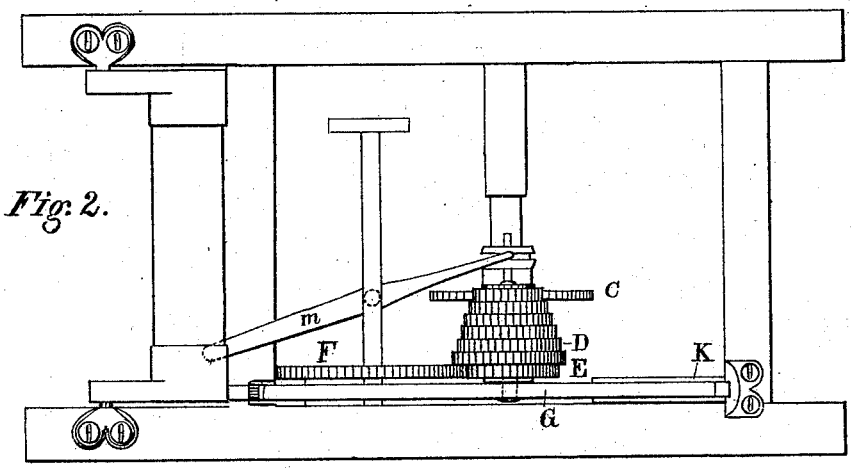
Figure 3:
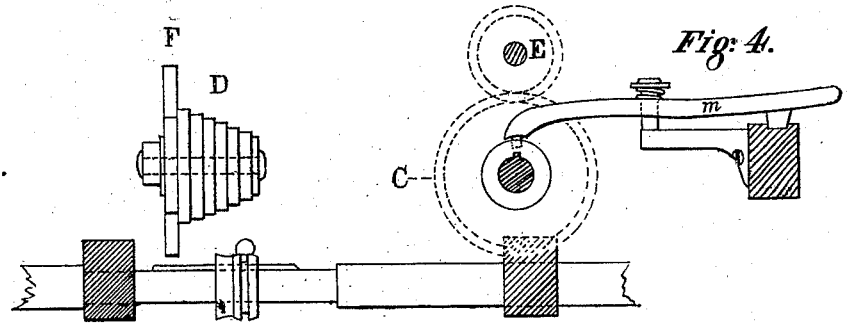
Figure 4:
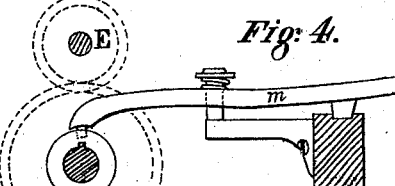

Figure 1 being an elevation, partly in section, and showing the grain-hopper, a portion of the frame of the machine, a toothed sector for holding the lever which carries the cone of gears in position, the pinion in the end of said lever, a ratchet for holding the pinion in position, a swinging arm with a projection upon it for operating the ratchet, a driving-gear upon the axle, a cone of gears, and a spur-gear which moves the grain-slides in the grain-hopper. Fig. 2 is a top view of the machine with the parts in position, and Figs. 3 and 4 are detail views of portions of the mechanism.

Corresponding letters denote like parts in all of the figures.

This invention relates to grain-drills, but is also applicable to broadcast sowers.

The improvements herein described consist in the means employed for holding the wheels which regulate the distribution of the grain in position, and in certain combinations and arrangements of some of the other parts of the machine, as will be more fully described hereinafter.

In constructing machines to which to apply my improvements, I make the frame A in any of the well-known forms, or in such a manner that it will receive and retain in position the parts which operate to distribute the grain, and place upon said frame a suitable hopper, B, for the reception of such grain. I also provide suitable wheels for carrying the operating parts of the machine, and mount them on an axle, in the usual way. Upon said axle there is placed a gear-wheel, C, which, as the machine is moved forward upon its carrying-wheels, gives motion to a nest of wheels, which, when placed side by side, form a conical wheel, for regulating the amount of grain to be distributed upon a given area of ground, the wheel C upon the axle being so arranged that it may be moved longitudinally thereon, so as to be made to mesh with any one of the wheels comprising the cone of gears.

The above-named parts do not constitute any part of my present improvement, except as they are combined therewith, and hence need not be more particularly described here.

The parts which constitute my improvement, and the manner of combining them with those already referred to, will now be described. It is apparent that in order that the different wheels which constitute the cone D may be made to mesh with the wheel C on the axle of the machine, said cone must be placed upon an axle or stud which is movable through an arc of a circle, so that when moved up or down to cause the wheels of greater or less diameter to mesh with the wheel C, the pinion E, which is upon the same axle or stud as is the cone, shall not be carried out of gear with the wheel F, which is mounted upon the shaft which moves the gear-distributing wheels in the hopper, or in seed-cups placed beneath said hopper.

To provide for the arrangement of parts just alluded to I pivot a lever, G, to the hopper, or to the frame upon which it rests, in such a manner that the point upon which it turns shall be coincident with the axis of the wheel which is upon the shaft of the grain-distributing wheels, as a consequence of which, when the lever is moved, the wheel E maintains its proper relation to the wheel F, whichever one of the wheels of the cone is in gear with the driving-wheel C. From the pivotal point the lever G, above alluded to, extends rearward, and is of such form as to admit of its being operated upon by a swinging arm, H, affixed to the frame of the machine, in such a way that when turned up into the position shown in full lines in Fig. 1 a projection, H', upon said arm shall operate to raise the opposite end of said lever; but when turned into the position shown in dotted lines in the same figure the rear end of the lever will be elevated by the weight of its opposite end, and by the wheels which it carries.

For holding the lever G in position there is attached to the frame of the machine a toothed sector, I, the teeth being on the inner side thereof, and so placed that as the lever G is moved up or down at the end which is next to said sector, a toothed wheel, K, which has its bearings in said lever, shall mesh into the teeth thereof, and thus hold the lever in position, except when the wheel K is allowed to rotate or turn upon its axis. For retaining the wheel K in position there is pivoted to the rear portion of lever G a ratchet, L, the rear end of which extends to and rests upon the rear end of the lever, as shown in Fig. 1, while its opposite end extends to a point nearly or directly over the center of the wheel K, at which point it has a hook or ratchet formed upon it, so that when the arm H is turned into the position shown in dotted lines in Fig. 1, it will fall into gear with the wheel K, and will hold the same from turning, and thus the lever will be prevented from changing its position, and hence the cone will be held in contact with whichever of the wheels may be in gear with the wheel C, by which it will be turned.

When it is desirable to change the amount of grain to be distributed upon any given area of ground, it is only necessary to raise the arm H to the position shown in full lines in Fig. 1, when the ratchet will be raised out of the teeth of the wheel K, and the position of the lever G will be changed by such movement of said arm to such an extent as to allow the wheel C to be moved longitudinally upon the axle, and thus brought into gear with any one of the wheels comprising the cone, and thus the amount of grain sown be regulated.

For giving longitudinal movement to the wheel C a lever, m, is provided, which is attached to the frame, so that, having a projection upon one of its ends which enters a groove formed in the hub of the wheels, by moving its opposite end, the wheel will be adjusted.

Having thus described my improvement, what I claim, and desire to secure by Letters Patent, is—

1. The combination of the ratchet L, lever G, and arm H, arranged with reference to each other substantially as shown and described, whereby the movement of the arm is made to release the ratchet from the wheel, and to change the position of the lever, for the purpose set forth.

2. In a machine for drilling or distributing grain, the combination of the ratchet L, the lever G, cone-gears D, ratchet-wheel K, sector I, driving-wheel C, and arm H, or their equivalents, when arranged to operate as and for the purpose set forth.

3. The combination of the lever G, the ratchet L, cone-gears D, and gear-wheel F, the parts being arranged to operate substantially as and for the purpose set forth.

In testimony that I claim the foregoing as my own I affix my signature in presence of two witnesses.

JAMES C. BUCK.

Witnesses:
O. M. GOTTSCHALL,
E. D. PAYNE, Jr.